Aug. 29, 1939.   O. EPPENSTEIN ET AL   2,170,967

PROJECTING APPARATUS

Filed July 12, 1938

Inventors:
Otto Eppenstein
Willy Diebel

Patented Aug. 29, 1939

2,170,967

UNITED STATES PATENT OFFICE 2,170,967

PROJECTING APPARATUS

Otto Eppenstein and Willy Dietzel, Jena, Germany, assignors to the firm of Carl Zeiss, Jena, Germany Application July 12, 1938, Serial No. 218,750
In Germany July 21, 1937

4 Claims. (Cl. 88—24)

An application has been filed in Germany, July 21, 1937.

The invention concerns a projection microscope with inclined viewing axis. Microscopes of this kind have been provided with a mirror which is coordinated to the eye-piece in such a manner that the images of the objects can be projected on a base surface near to where this surface supports the microscope, the respective part of this base surface constituting a projection screen.

According to the invention, the reflecting surface coordinated to the eye-piece is so arranged as to deviate the imaging rays emanating from the eye-piece upwardly at approximately 90° before these rays strike the screen, which is above the microscope. As the screen is in some cases desired to be a transparent ground glass plate and no dull white surface, it is convenient to provide that it is near the eye-piece and approximately vertical, and that the imaging rays can be deviated to this screen by another reflecting surface lying in the ray path. To have as small a reflecting surface as possible, it is especially advantageous to provide this surface between the optical elements of the eye-piece, viz. at the place of the exit pupil, where the cross-section of the pencil of imaging rays is smallest. In the case of two reflecting surfaces, it is advisable to dispose between these elements the surface which is struck by the rays first.

Constructional forms of the invention are illustrated in the accompanying drawing, in which—

Figure 1:
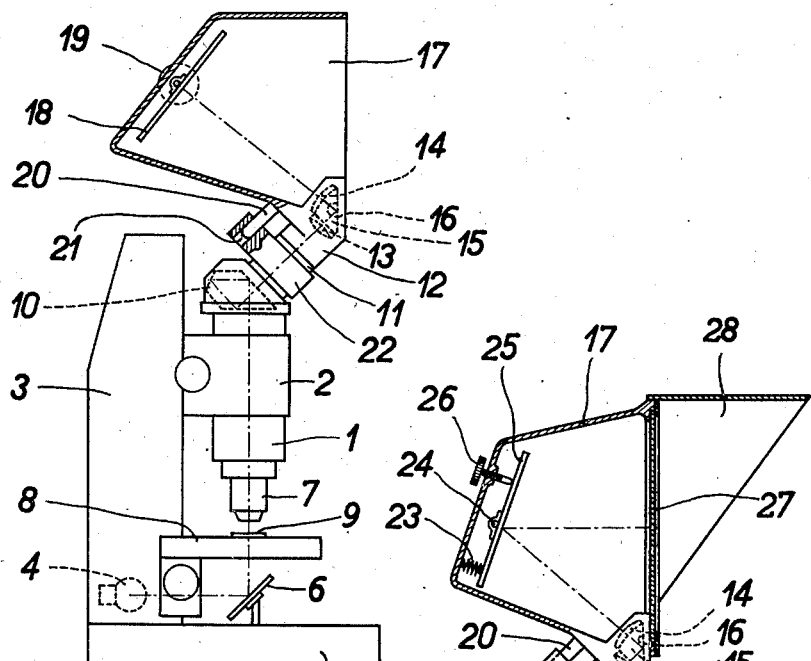
Figure 2:
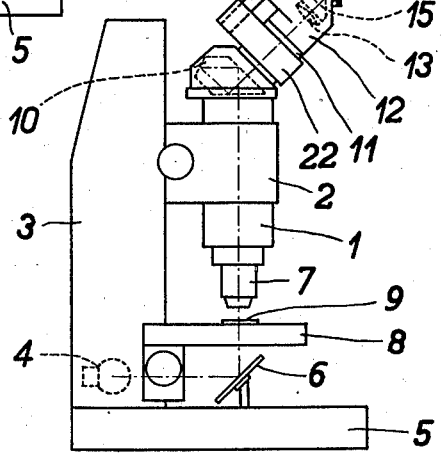

Figure 1 shows a part-sectional side view of a projecting apparatus having a reflecting surface between the eye-piece and the screen, and in which Figure 2 represents a part-sectional side view of a projecting apparatus having two reflecting surfaces between the eye-piece and the ground glass plate.

The apparatus represented by Figure 1 is a microscope 1 which has an inclined viewing axis and is disposed in a holder 2 adjustable along a stand 3. This stand 3 contains an incandescent lamp 4 the light pencil of which is directed by a mirror 6 on a foot 5 to the microscope objective 7. 8 is a stage for the object 9 to be projected, this stage being adjustable up and downwardly. A prism 10 is disposed in the ray path of the microscope, so that the axis of the eye-piece is inclined to that of the objective. The microscope eye-piece for direct observation is replaced by a projection eye-piece comprising elements 13 and 14 and mounted in a tube 12 placed over the eye-piece tube 11. Between the elements 13 and 14 of this eye-piece, a reflecting prism 15 is disposed in such a manner that its reflecting surface 16 deviates the imaging rays at approximately 90° upwardly. To the tube 12 is fixed a box-like housing 17 containing a projection screen 18 which can be inclined by means of a milled head 19. The housing 17 can be arrested by means of a pin 20 fast with the lower part of the housing and adapted to extend into the corresponding bore 21 of a sleeve 22 fast with the eye-piece tube 11. The housing 17 protects the projected image of the object against laterally incident light.

Figure 2 shows substantially the same microscope as Figure 1. In Figure 2, however, the housing 17 contains instead of the screen 18 a mirror 25 which is influenced by a pressure spring 23 and rotatable about a pin 24, and which can be adjusted against the action of the spring 23 by means of an adjusting screw 26. The parts identical with parts in Figure 1 have corresponding reference numerals. The screen for the projected image of the object is a transparent ground glass plate 27 disposed in the housing 17. The plate 27, which is vertical, is protected against disturbing lateral light by a cap 28 provided on the housing 17. In this constructional form of the microscope, the surface 16 of the reflecting prism 15 constitutes the first and the mirror 25 the second reflecting surface.

We claim:

1. A projecting apparatus comprising a microscope stand, a light source, means directing light emanating from said light source, an object holder, a tube in optical alignment with said object holder and said light source, means securing said tube on said stand, an objective lens mounted in said tube, a reversing and deviating prism mounted in said tube at the opposite end to said objective lens and directing said light beam at an angle to the axis of said objective, an eye-piece lens mounted in optical alignment with said prism, a screen disposed above said microscope stand, a mirror coordinated to said eye-piece to reflect the projection beam substantially in the same plane upwardly and backwardly at approximately 90 degrees before said beam strikes said screen, a casing containing said eye-piece, said mirror and screen, and means to mount said casing detachably on said tube.

2. A projecting apparatus comprising a microscope stand, a light source, means directing light emanating from said light source, an object holder, a tube in optical alignment with said object holder and said light source, means securing said tube on said stand, an objective lens mounted in said tube, a reversing and deviating prism mounted in said tube at the opposite end to said objective lens and directing said light beam at an angle to the axis of said objective, an eye-piece lens mounted in optical alignment with said prism, a mirror coordinated to said eye-piece to reflect the projection beam substantially in the same plane upwardly and backwardly at approximately 90 degrees, another mirror, said other mirror being disposed in the ray path and reflecting the projection beam forwardly, a translucent screen positioned vertically above said microscope stand and to receive the imaging rays reflected by said other mirror, a casing containing said eye-piece, both said mirrors and said screen, and means to detachably mount said casing on said tube.

3. A projecting apparatus comprising a microscope stand, a light source, means directing light emanating from said light source, an object holder, a tube in optical alignment with said object holder and said light source, means securing said tube on said stand, an objective lens mounted in said tube, a reversing and deviating prism mounted in said tube at the opposite end to said objective lens and directing said light beam at an angle to the axis of said objective, an eye-piece comprising a plurality of lenses mounted in optical alignment with said prism, a screen disposed above said microscope stand, a mirror disposed between the lenses of said eye-piece to reflect the projection beam substantially in the same plane upwardly and backwardly at approximately 90 degrees before said beam strikes said screen, a casing containing said eye-piece, said mirror and screen, and means to mount said casing detachably on said tube.

4. A projecting apparatus comprising a microscope stand, a light source, means directing light emanating from said light source, an object holder, a tube in optical alignment with said object holder and said light source, means securing said tube on said stand, an objective lens mounted in said tube, a reversing and deviating prism mounted in said tube at the opposite end to said objective lens and directing said light beam at an angle to the axis of said objective, an eye-piece comprising a plurality of lenses mounted in optical alignment with said prism, a mirror disposed between the lenses of said eye-piece to reflect the projection beam substantially in the same plane upwardly and backwardly at approximately 90 degrees, another mirror, said other mirror being disposed in the ray path and reflecting the projection beam forwardly, a translucent screen positioned vertically above said microscope stand and to receive the imaging rays reflected by said other mirror, a casing containing said eye-piece, both said mirrors and said screen, and means to detachably mount said casing on said tube.

OTTO EPPENSTEIN.
WILLY DIETZEL.